US009300140B2

(12) United States Patent
Thomas et al.

(10) Patent No.: US 9,300,140 B2
(45) Date of Patent: Mar. 29, 2016

(54) SYSTEM AND METHOD FOR DESIGN AND OPTIMIZATION OF GRID CONNECTED PHOTOVOLTAIC POWER PLANT WITH MULTIPLE PHOTOVOLTAIC MODULE TECHNOLOGIES

(75) Inventors: Bex George Thomas, Ballston Lake, NY (US); Ahmed Elasser, Latham, NY (US); Srinivas Bollapragada, Niskayuna, NY (US); Anthony William Galbraith, Wirtz, VA (US); Mohammed Agamy, Niskayuna, NY (US); Maxim Valeryevich Garifullin, Barrington, IL (US)

(73) Assignee: General Electric Company, Niskayuna, NY (US)

( * ) Notice: Subject to any disclaimer, the term of this patent is extended or adjusted under 35 U.S.C. 154(b) by 695 days.

(21) Appl. No.: 13/535,617

(22) Filed: Jun. 28, 2012

(65) Prior Publication Data
US 2014/0005845 A1  Jan. 2, 2014

(51) Int. Cl.
*G05F 5/00* (2006.01)
*H02J 3/38* (2006.01)

(52) U.S. Cl.
CPC . *H02J 3/385* (2013.01); *Y02E 10/58* (2013.01)

(58) Field of Classification Search
None
See application file for complete search history.

(56) References Cited

U.S. PATENT DOCUMENTS

| 8,004,116 | B2 | 8/2011 | Ledenev et al. |
|---|---|---|---|
| 8,044,538 | B2 | 10/2011 | Ragonese et al. |
| 2010/0001587 | A1 | 1/2010 | Casey et al. |
| 2010/0200043 | A1 | 8/2010 | Lombardo et al. |
| 2010/0236239 | A1* | 9/2010 | Kroizer et al. ............... 60/641.8 |
| 2010/0295382 | A1* | 11/2010 | Tae et al. ....................... 307/150 |
| 2010/0295383 | A1* | 11/2010 | Cummings ................... 307/151 |
| 2011/0084553 | A1 | 4/2011 | Adest et al. |
| 2012/0091810 | A1* | 4/2012 | Aiello et al. .................... 307/64 |
| 2012/0319489 | A1* | 12/2012 | McCaslin et al. ............... 307/77 |
| 2014/0049115 | A1* | 2/2014 | Adest et al. ..................... 307/77 |
| 2014/0060610 | A1* | 3/2014 | Moslehi et al. ............... 136/244 |

OTHER PUBLICATIONS

Walker et al.,"Cascaded DC-DC Converter Connection of Photovoltaic Modules", IEEE 33rd Annual Power Electronics Specialists Conference PESC '02, vol. 1, pp. 24-29, 2002.

Roman et al., "Intelligent PV Module for Grid-Connected PV Systems", IEEE Transactions on Industrial Electronics, vol. 53, Issue 4, pp. 1066-1073, Jun. 2006.

Liccardo et al., "Interleaved DC-DC Converters for Photovoltaic Modules", International Conference on Clean Electrical Power, 2007. ICCEP '07, pp. 201-207, Capri, May 21-23, 2007.

(Continued)

*Primary Examiner* — Robert Fennema
*Assistant Examiner* — Md N Mia
(74) *Attorney, Agent, or Firm* — Paul J. DiConza (57) ABSTRACT

A system and method of using one or more DC-DC/DC-AC converters and/or alternative devices allows strings of multiple module technologies to coexist within the same PV power plant. A computing (optimization) framework estimates the percentage allocation of PV power plant capacity to selected PV module technologies. The framework and its supporting components considers irradiation, temperature, spectral profiles, cost and other practical constraints to achieve the lowest levelized cost of electricity, maximum output and minimum system cost. The system and method can function using any device enabling distributed maximum power point tracking at the module, string or combiner level.

14 Claims, 8 Drawing Sheets

(56) References Cited

OTHER PUBLICATIONS

Deline et al., "A Performance and Economic Analysis of Distributed Power Electronics in Photovoltaic Systems", National Renewable Energy Laboratory Technical report, pp. 1-20, Jan. 2011.

Allet et al., "Evaluation of PV System Performance of Five Different PV Module Technologies", 26th European Photovoltaic Solar Energy Conference, pp. 1-9, Hamburg, Session 4DO.6.2, Sep. 5-9, 2011.

* cited by examiner

SYSTEM AND METHOD FOR DESIGN AND OPTIMIZATION OF GRID CONNECTED PHOTOVOLTAIC POWER PLANT WITH MULTIPLE PHOTOVOLTAIC MODULE TECHNOLOGIES

STATEMENT REGARDING FEDERALLY SPONSORED RESEARCH & DEVELOPMENT

This invention was made with U.S. Department of Energy support under contract number DE-EE0000572. The Government has certain rights in the invention.

BACKGROUND

The subject matter of this disclosure relates generally to Photovoltaic (PV) systems, and more specifically to a system and method for design and optimization of a grid connected PV power plant using multiple PV module technologies.

PV systems have emerged as one of the major power providers using clean, renewable energy. Technological advances in PV cell materials, cell and module manufacturing, power systems components, systems installation techniques, innovative financing and effective renewable energy policies have led to improvements in PV power economics. Modules of different PV technologies have different conversion efficiencies, different costs and exhibit different responses to irradiation, temperature and spectral quality. Traditionally, a PV power plant design using a central inverter architecture only uses modules with the same electrical operating characteristics within the same PV system. This is because it is critical to have modules well matched in their electrical configuration to avoid mismatch losses and gain maximum power output. However, a location dependent selection of a combination of PV module technologies may provide an opportunity to reduce system cost, improve energy yield and reduce levelized cost of electricity (LCOE).

In view of the foregoing, there is a need for a system and architecture that will allow PV modules of different electrical characteristics to coexist within the same PV power plant. Further, it would be advantageous to provide an associated computing technology that will allow estimation of the allowable number of PV modules of different PV technologies to minimize the system cost and LCOE.

BRIEF DESCRIPTION

Briefly, in accordance with one embodiment, a PV power plant comprises:
a first PV module having a first maximum power point;
a second PV module having a second maximum power point, wherein the first maximum power point is different from the second maximum power point under identical operating conditions;
a first DC-DC/DC-AC converter connected to the first PV module, wherein the first DC-DC/DC-AC converter comprises a maximum power point tracker or maximum power point controller programmed to track and maximize the first PV module power point; and
a second DC-DC/DC-AC converter connected to the second PV module, wherein the second DC-DC/DC-AC converter comprises a maximum power point tracker or maximum power point controller programmed to track and maximize the second PV module power point.

A PV power plant according to another embodiment comprises:
a first string of PV modules having a first maximum power point;
a second string of PV modules having a second maximum power point, wherein the first maximum power point is different from the second maximum power point under identical operating conditions;
a first DC-DC/DC-AC converter connected to the first string of PV modules, wherein the first DC-DC/DC-AC converter comprises a maximum power point tracker or maximum power point controller programmed to track and maximize the first PV module string power point; and
a second DC-DC/DC-AC converter connected to the second string of PV modules, wherein the second DC-DC/DC-AC converter comprises a maximum power point tracker or maximum power point controller programmed to track and maximize the second PV module string power point.

A PV power plant according to yet another embodiment comprises:
a plurality of PV modules, wherein the plurality of PV modules has a plurality of differing maximum power points under operating conditions identical to all PV modules within the plurality of PV modules; and
a plurality of DC-DC/DC-AC converters connected to the plurality of PV modules, wherein each DC-DC/DC-AC converter comprises a maximum power point tracker or maximum power point controller programmed to track and maximize an individual PV module power point, a power point for a string of PV modules, a power point for a plurality of strings of PV modules, or a combination thereof.

According to still another embodiment, a method of optimizing a photovoltaic (PV) power plant with multiple photovoltaic module technologies comprises:
programming an optimization processor with algorithmic software to generate an estimated system cost and levelized cost of electricity (LCOE) for the PV power plant relative to selected PV technology scenarios subject to desired constraints and requirements, wherein the desired constraints and requirements are selected from area constraints, capacity constraints, budget constraints, yield requirements, power density requirements, toxic/material constraints, voltage requirements, transmission constraints, and system degradation constraints; and
estimating the LCOE via the optimization processor, wherein the estimated LCOE is represented as, $$LCOE_s = \frac{\left(FC_{W_p} + \sum_t x^t IC^t W_p\right) - \left(\sum_{n=1}^{N}\sum_t \frac{(x^t D^t)}{(1+d_{cash})^n}(r_{tax})\right) + \left(\sum_{n=1}^{N}\sum_t \frac{(x^t AC^t)^n}{(1+d_{cash})^n}(1-r_{tax})\right)\left(\sum \frac{x^N RV^N}{(1+d_{cash})^N}\right)}{\left(\sum_{n=1}^{N}\sum_t \frac{x^t AEP_s^t(1-\lambda^t)^n}{(1+d_{real})^n}\right)}$$

wherein s represents a scenario, $FC_{W_p}$ represents initial fixed installation system cost for the PV power plant expressed in $/W_p$ wherein $W_p$ represents required PV power plant size in Watt-peak, $x^t$ represents percentage of DC power supplied by module technology t, $IC^t$ represents initial variable installation system cost for PV power plant with distributed DC-DC stage architecture and module technology t expressed in $/W_p$, N represents lifetime of PV power plant in years, n represent a year, $D^t$ represents depreciation amount for PV power plant with distributed DC-DC stage architecture and module technology t, $d_{cash}$ represents cash discount rate in percentage, $r_{tax}$ represents tax rate in percentage, $AC^t$ represents recurring annual cost of PV power plant with distributed DC-DC stage architecture and module technology t expressed in $, $RV^N$ represents residual value of PV power plant with distributed DC-Dc stage architecture and module technology t expressed in $, $x^N$ represents percentage of DC power supplied by technology t during lifetime of PV power plant in years, $AEP_s^t$ represents performance/yield requirements of the PV power plant with distributed DC-DC stage architecture and module technology t for scenario s, $\lambda^2$ represents module degradation rate for technology t, and $d_{real}$ represents a real discount rate in percentage.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
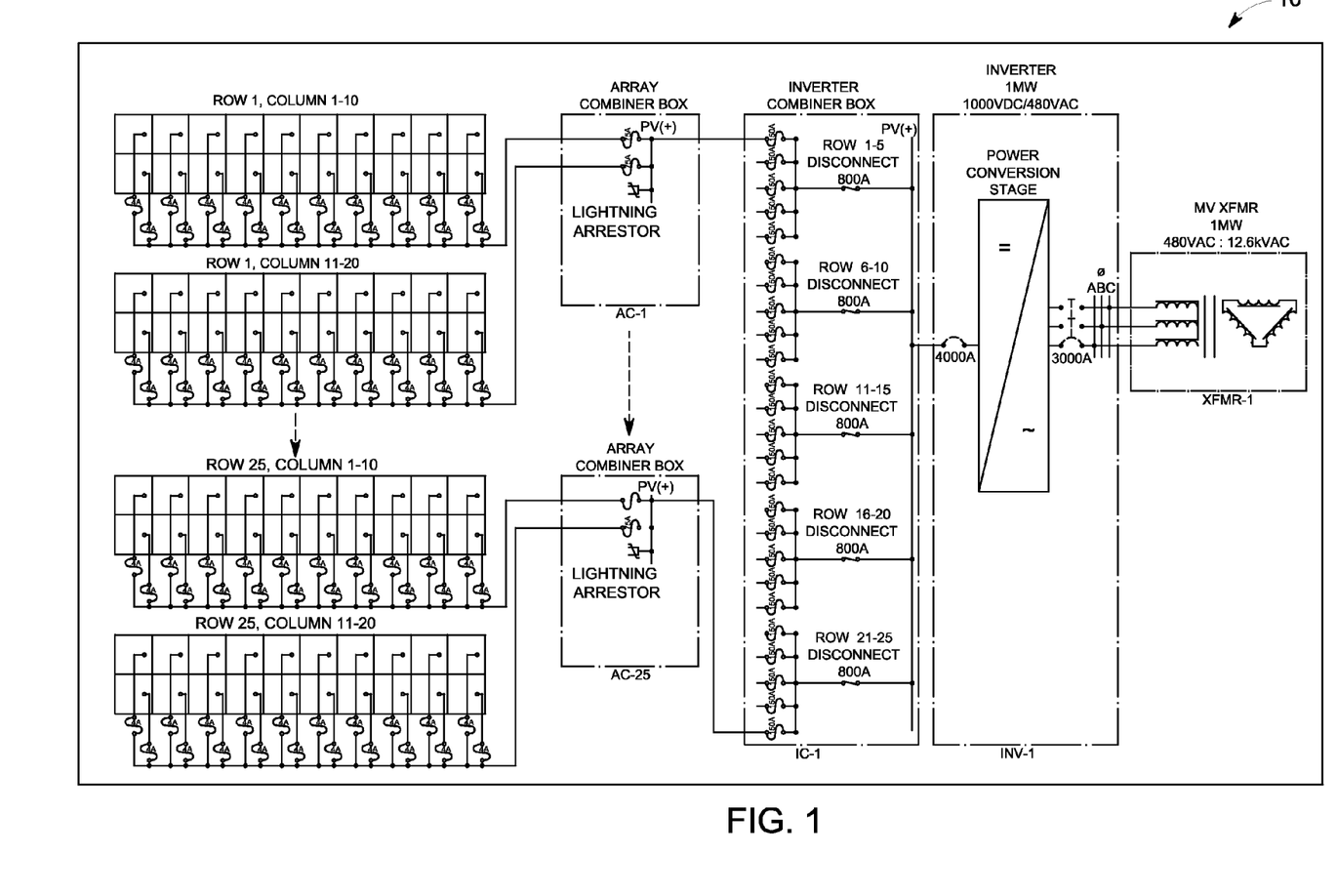
FIG. 1 is a schematic diagram depicting a PV power plant 10 that employs a central inverter architecture.

The major components of a grid connected PV power plant include PV module(s), mounting system(s), inverter(s), and balance of systems (BOS) components. A PV module is the fundamental component of a PV system and converts solar irradiation into direct current (DC) electrical energy. The mounting systems support the PV modules and provide optimum orientation to capture maximum solar irradiation. The inverter is the interconnection between the PV modules and the electric grid. The inverter converts the DC power produced by PV solar panels to alternating current (AC) power and matches the voltage and frequency of the grid. The inverter is equipped with a real time micro controller that performs all the power management functions necessary including maximum power point tracking, DC-DC functions and DC-AC conversions. Sometimes the inverter is also equipped with an isolating transformer that provides galvanic separation of the PV system from the electric grid in addition to the voltage ratio changing. The balance of systems components includes monitoring and diagnostics systems, array combiners, DC and AC disconnects, wiring, transformers, surge protectors, and ground fault interrupters. FIG. 1 is a schematic diagram depicting a PV power plant 10 that employs a central inverter architecture.

Modules in a traditional PV power plant must have identical electrical performance characteristics for optimum performance. This is because mismatch losses will occur if the electrical parameters of a PV module are altered from those of the remaining modules in a series configuration. Furthermore, mismatch losses can also occur because of external environmental conditions such as shading, soiling etc. Modules in PV systems are traditionally connected in a series parallel configuration, with the modules being connected in series to form a string up to the maximum voltage as specified by the NEC code; and then the strings are connected in parallel. Because of the series parallel interconnection, the power output of the system is affected by the performance of the weakest string or panel.

When a PV module connected in series to form a string does not operate at its maximum power point (MPP), the performance of the string is now limited by the performance of the module not operating at its MPP. Differences in any part of the current-voltage (IV) curve between one module and another then leads to mismatch losses at some operating point. Although mismatch may occur in any number of module parameters, large mismatches are most commonly caused by differences in either the short-circuit current ($I_{sc}$) or open-circuit voltage ($V_{oc}$). The impact of the mismatch depends on both the circuit configuration and on the type of mismatch Strings of PV modules with multiple electrical characteristics pose a problem with conventional central inverter architectures because central inverters traditionally have a range of voltage and current in which they can operate. If the combination goes outside the range of the inverter, it fails to convert the DC to AC or sets itself at the extreme operating range of the inverter thereby resulting in the loss of efficiency and energy. Traditional inverters do not react quickly to the electrical variations in the PV system and hence seldom reach the maximum power point of the PV modules.

Enabling devices and architectures that can reduce mismatch losses are required to connect modules or strings with different electrical characteristics within the same PV power plant. According to one embodiment, such an enabling device is a DC-DC or DC-AC converter with a maximum power point tracker or controller. The tracker or controller maximizes the power output from the PV system through maximum power point tracking (MPPT).

Maximum power point tracking is generally performed at the array level with a central inverter architecture, and hence has a high degree of centralization. Most maximum power point tracking employed with a central inverter architecture assumes that current-voltage (IV) curves are linear with one MPP. This is true when all the panels work under the same operating condition. However, if the modules have different operating conditions, the panels or string(s) would not operate at their MPP thus resulting in significant energy losses. To avoid this situation, the DC-DC/DC-AC conversion and MPPT functions are moved to the string or panel level. Since the MPPT is now calculated at the panel or string level, the efficiency of the central inverter is increased since the only function it performs is DC-AC conversion along with other grid friendly functions such as anti-islanding, and ride-through functions. According to various embodiments described herein, the DC-DC/DC-AC converter along with the MPPT can be installed at the module, string or the combiner level depending on the location, layout, resource and cost constraints to maximize the energy yield output.

Figure 2:
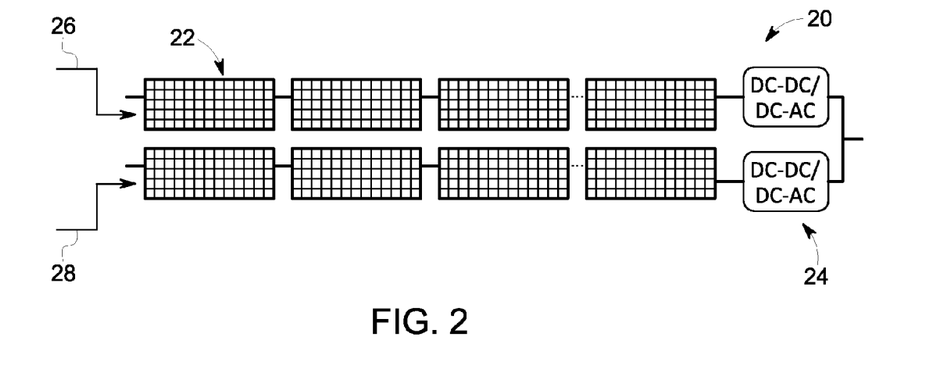
FIG. 2 shows a string level distributed MPPT according to one embodiment, where a number of modules are connected in series to a DC-DC converter in each string to make up a corresponding DC-DC converter string.

FIG. 2 shows a string level distributed MPPT structure 20 according to one embodiment, where a number of modules 22 are connected in series to a DC-DC or DC-AC converter 24 in each string to make up a corresponding DC-DC converter string 26, 28. Such a distributed MPPT architecture ensures the control of the MPP is now limited to a string or panel. Distributed MPPT allows for quicker reaction to electrical variations in the system and hence leads to better control, and higher overall annual energy yield.

String level MPPT along with DC-DC/DC-AC conversion bucks or boosts the voltage of the PV strings 26, 28 to the DC/AC bus voltage. Since the control is at the string level, any module within the string not operating at its MPP leads to potential energy loss. System level yield using string level MPPT is typically improved by about 6%-8% over that achievable using architectures without distributed MPPT.

Module level MPPT maximizes the energy from each module by tracking the power-output changes, operating the module at its MPP and maintaining continuous grid connectivity. The module level DC-DC/DC-AC converter tracks the best localized MPP and translates the input/output current to a different output voltage to maximize the energy from the PV module. Module level MPPT allows the modules to be in series to form a string and then the strings to be in parallel at the inverter level. This DC-DC/DC-AC architecture works well with central inverters since it allows the inverter to run more efficiently by maintaining the bus voltage at a steady level. The improvement in the system level yield using module level MPPT is typically in the range of 8%-12%.

Figure 3:
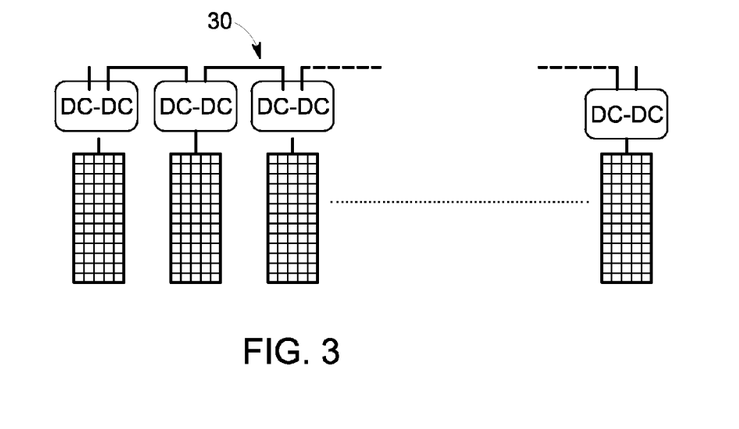
FIG. 3 illustrates one embodiment of a module level distributed MPPT framework.
Figure 4:
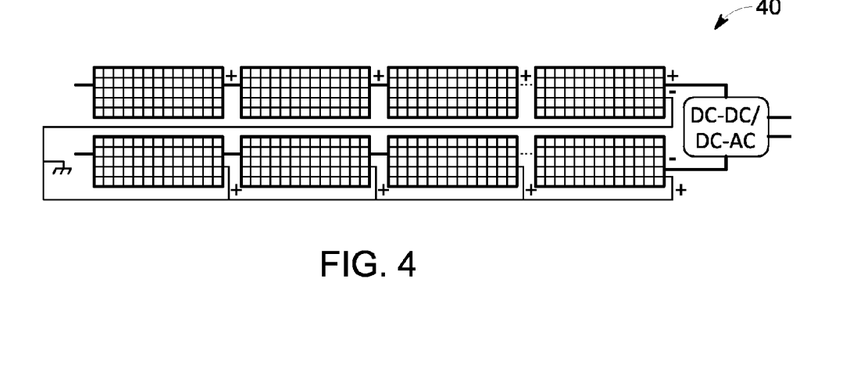
FIG. 4 illustrates one embodiment of a combiner level or multi string distributed MPPT framework and that employs a bipolar string topology.

FIG. 3 illustrates one embodiment of a module level distributed MPPT structure 30; while FIG. 4 illustrates a string level distributed MPPT structure 40 that employs a bipolar string topology. Both string level MPPT and module level MPPT solutions allow maximum energy to be harvested from the PV arrays but differ in cost and performance. The module level distributed MPPT structure 30 provides better yield than at the string level.

Advancements in materials such as high frequency inductors and improvement of the control circuits have led to significant impacts on PV inverter topologies, efficiencies and cost reductions. The three inverter families described herein can be summarized as: (1) central inverters (2) string inverters and (3) module micro inverters.

The central inverter topology performs the DC to AC conversion and includes PV modules arranged in series and parallel to get the desired current, voltage and power. The conversion can be single or multi-stage conversion processes. Only few inverters—depending on the power output—are used to interface with the grid. The MPP tracker within the inverter attempts to find the maximum power point at current irradiance using the trial and error algorithm by adjusting the load on the entire system. MPPT with a central inverter is performed on the solar array as an aggregate. However, changes in temperature, irradiance, and shading create complex current-voltage and power curves with multiple maximal, thereby making it difficult or impossible for the MPPT algorithm to find an optimal power point for all the modules. This compromises the PV plant operating conditions and results in less than optimal energy harvest.

The string inverter topology 40 accepts DC power from a string of many series solar panels. MPPT in a string inverter is performed on a string of multiple PV modules. This kind of distributed MPPT leads to higher energy yield than the central inverter architecture that performs system level MPPT. The string inverter can be transformerless, hence compact and low weight with high efficiency. There may still be a need for a medium voltage transformer to connect to the grid.

The micro inverter is a small inverter that converts DC power to AC compliant grid power from a single solar panel. MPPT is carried out for individual PV panels using micro inverters. Studies suggest that certain residential installations using micro inverters will see an increase in energy yield of 5% to 25% over a central inverter solution. As the panels age differently or the shading on the panels varies, the energy output from the micro inverter installations will be higher than a string or central inverter installations since the energy production of the string(s) depends on the output of the weakest panel(s). The string or central inverter approach does not scale easily. If the string is already operating at full potential, it must be replaced with a larger or a second string inverter. The micro inverter architecture 30 is perfectly suited to scaling. Each panel is served by its own inverter and they are added to the system in sets as needed; one panel and one micro inverter at a time. So, one can easily add as little as 200 watts or as much as 10 KVA to an existing system with relative ease and simplicity.

DC-DC/DC-AC converters at the module or string level can be used to combine PV modules with different electrical characteristics. Combinations of string inverters and micro inverters can also be used to combine PV modules with different electrical characteristics. The selection of these enabling devices will generally depend on the performance, reliability and budget constraints as well as on the size of the PV plant (Residential vs. Commercial vs. Utility). The architecture embodiments described herein for enabling combinations of PV panels with multiple technologies use a distributed DC architecture with string level MPPT. A distributed DC architecture transfers the role of tracking the MPP from a centralized PV inverter to controllers or trackers placed on each string or panel.

The percentage allocation of PV power plant capacity to selected PV module technologies applied in a distributed DC architecture such as described herein can be estimated using an optimization framework such as described herein according to particular embodiments. According to one aspect, an optimization framework takes into account system costs (initial cost, operating cost, lifecycle cost), various scenarios for energy yield and system constraints. A scenario-based approach for capacity allocations, which will allow minimization of the expected LCOE under all input scenarios, is described herein. The supporting computing components for the optimization framework according to one embodiment are system design and cost estimation, energy yield simulation and system output estimation, and scenario generation.

Figure 5:
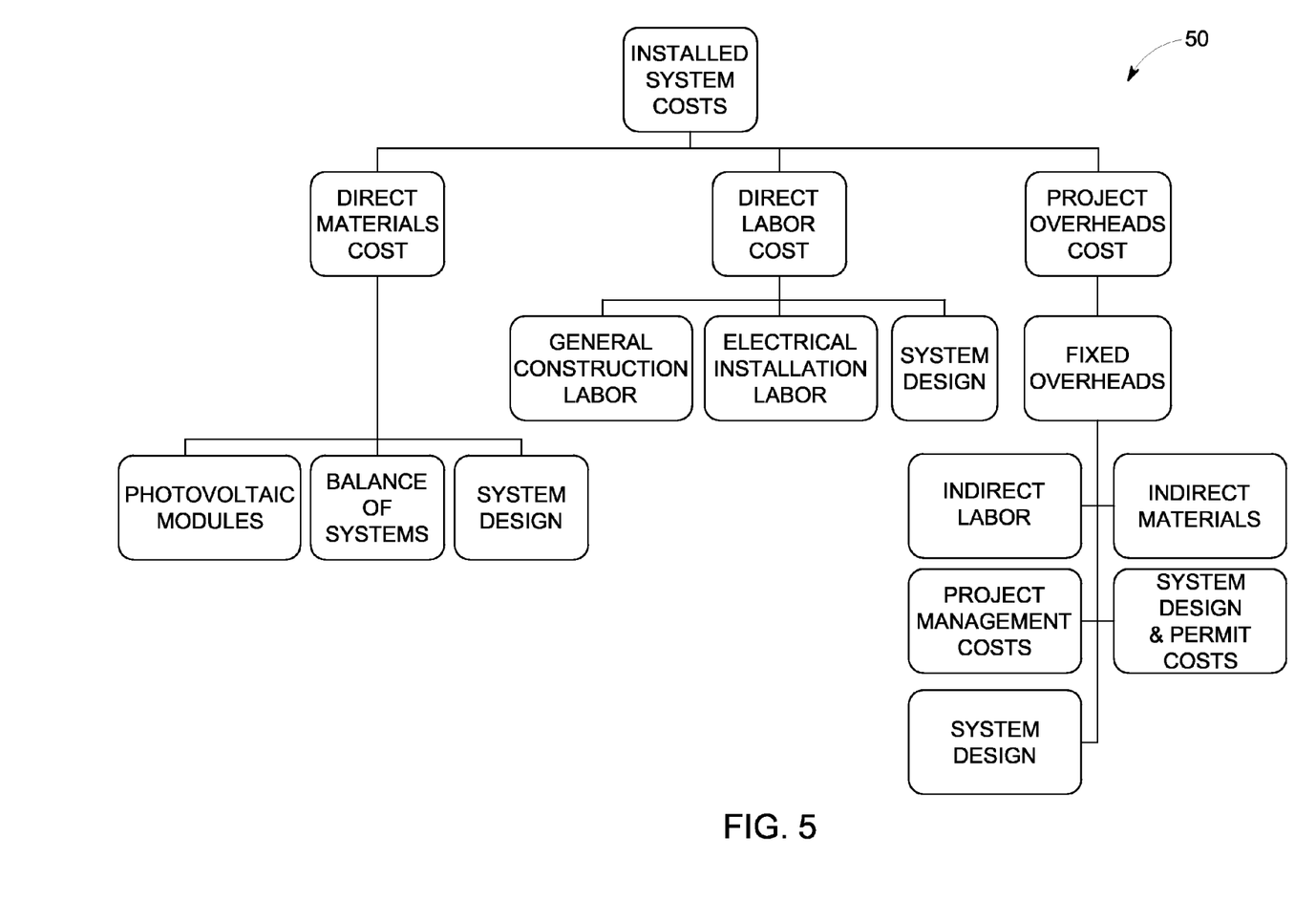
FIG. 5 shows a detailed breakdown of the installed system cost for one embodiment of a solar PV power plant.

According to one embodiment, the initial system cost of a unit of solar PV power plant is estimated using system design and layout, system component choices, bill of materials, installation process, labor costs and installation overheads. FIG. 5 is a chart 50 showing a detailed breakdown of the installed system cost for one embodiment of a solar PV power plant.

Figure 6:
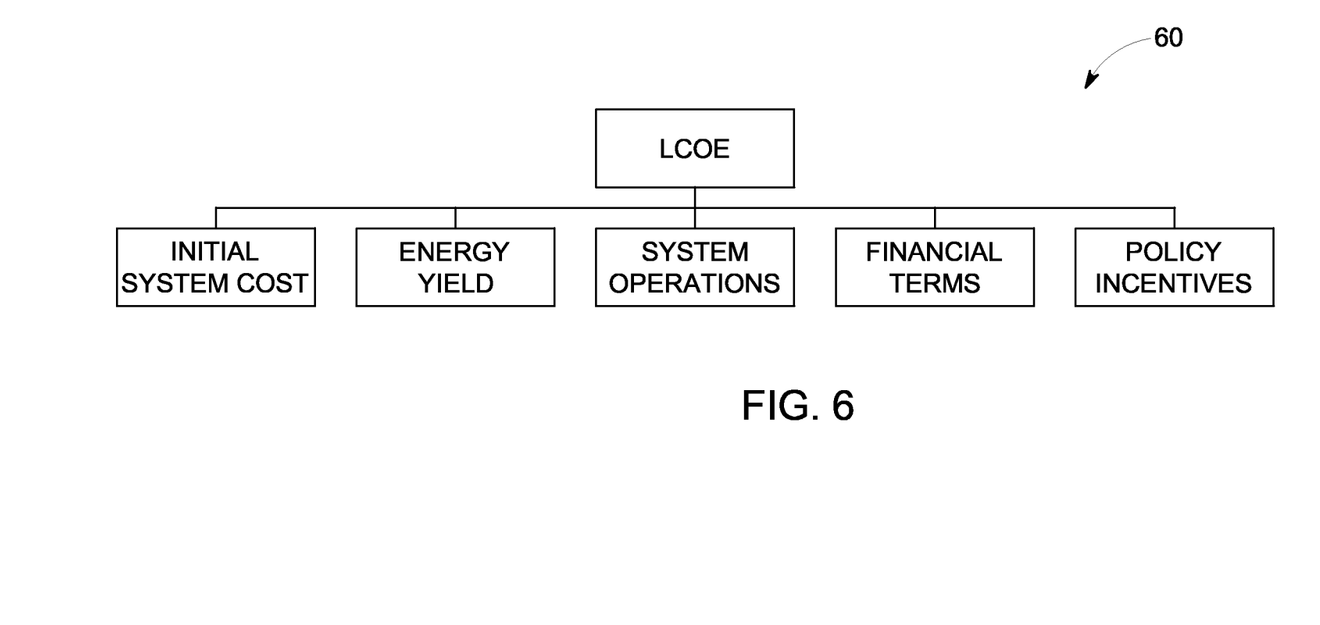
FIG. 6 shows a levelized cost of electricity breakdown for a PV power plant according to one embodiment.

System lifecycle costs are usually expressed using the levelized cost of electricity (LCOE). The LCOE is an evaluation of the cost of energy produced by a PV power plant over its lifetime. It allows a comparison between different architectures and the module technologies. The LCOE captures the energy yield, capital costs also known as installed system costs, operating costs, financial costs, financing terms, policy incentives over the life-cycle of the PV power plant. FIG. 6 is a chart 60 showing a levelized cost of electricity breakdown for a PV power plant according to one embodiment.

An energy yield simulation tool according to one embodiment estimates the output from a specified PV power plant module given the temperature and irradiance profile. According to one aspect, a simulation program accounts for different module electrical characteristics, system design, shading, component efficiencies and system losses. One embodied methodology compares actual irradiance to a moving average to account for partial shading. This methodology can also be employed when a PV power plant is shaded during a particular hour of the day and to estimate the percent of plant that is shaded.

The energy yield of a PV system depends on several different factors such as, for example, 1) PV module power output which depends on (a) solar irradiance: Energy yield of modules of different technologies vary in their spectral sensitivity. The irradiance in turn depends on the meteorological conditions; (b) module temperature: The module conversion efficiency is a nonlinear function of the irradiance level and module temperature. The module conversion efficiency typically declines with low irradiances and higher temperatures; (c) angle of incidence: The angle of incidence reduces the light to the conversion cell materials and in turn reduces the module temperature and output power; and (d) the current voltage (I-V) operating point;

2) Efficiency of the components; and

3) Losses occurring in the system.

According to one embodiment, irradiance and temperature profiles for a full year are fed to PV module transfer functions and the power is integrated over the whole year for different architectures. PV module transfer functions are based upon the particular application. As an example, the PV module transfer functions for a multi-crystalline silicon 200 Watt module and a 62.5 Watt thin film cadmium Telluride (CdTe) module are known and can be used for one application.

The efficiency of the DC-DC converter is estimated as follows:

$$\eta = (P_{in} - P_{losses})/P_{in} \quad (1)$$

where $P_{in}$ is the input power level, and $P_{losses}$ is the sum of conduction, switching and passive (e.g. inductors, capacitors) losses in the power converter. The efficiency of the central inverter is assumed to be the efficiency of the single stage DC-AC conversion stage. The associated cable losses are estimated according to one embodiment by a function that has the number of cables, cable size, voltage and wire length as variables. The PV power plant total yield is quantified and expressed as kWh-Yr/W.

Resource uncertainty as used herein means the uncertainty in the temperature and irradiance for a given location. According to one embodiment a methodology is developed to determine if the plant is shaded during a particular hour of the day and to estimate the percent of plant that is shaded when the plant is shaded. Irradiance and temperature profiles for a full year are fed to the PV module transfer functions. Partial shading due to clouds is then represented by comparing the actual irradiance to a moving average.

According to one embodied methodology, it is assumed that temperature, irradiance and the percentage of PV plant that is shadowed at a particular time period can take several values and have uncertainties associated with them. The uncertainties are modeled in problem parameters such as temperature, irradiance and shading using scenarios each with a specified probability. A scenario consists of an estimate of temperature, irradiance and shading. For a given location, scenarios are generated and probabilities are assigned to each scenario. The scenarios are also assumed to be independent of one another. Multi-period scenarios are represented as scenario trees. Multi-period scenarios can be generated using a sequential procedure. The sequential procedure generates a first period scenario based on the statistical properties specified for each of the parameters. For periods subsequent to the first period, conditional statistical properties based on the estimates of the previous period is used to come up with current period estimate.

Keeping the foregoing detailed description in mind, one embodiment of an optimization framework is now described that estimates the percentage allocation of PV power plant capacity to selected PV module technologies. The embodied optimization framework takes into account system costs (initial cost, operating cost, lifecycle cost), various scenarios for energy yield and system constraints. A scenario-based approach for capacity allocation is described which will allow minimization of the expected LCOE under all input scenarios.

As used herein, PV system size or peak capacity is defined as the peak power generated by the system at any point in time under Standard Test Conditions (STC) without considering any losses occurring in the system. The embodied optimization framework is implemented by first formulating and modeling a capacity allocation problem under cost and yield uncertainty. The problem according to one embodiment is modeled as a mixed integer program (MIP) with multiple linear constraints. The available area, budget, energy yield and power plant size, end of life waste toxic material, system voltage, transmission limitations etc. are modeled as constraints. The objective is then to minimize the lifecycle cost of the PV power plant by adjusting the percentage allocation of modules of different technologies. One embodiment considers a discrete time planning horizon of N time periods (~25 years) with each time period set to one year. The technology capacity allocation is then formulated as a scenario based math programming problem as described for one embodiment herein.

Minimize:
Expected LCOE of the combined PV power plant under all input scenarios Subject to:
  Area Constraints;
  Capacity Constraints;
  Budget Constraints;
  Yield (AEP) Requirements;
  Power Density Requirements;

(Toxic) Material Constraints;
Voltage Requirements;
Transmission Constraints; and
System Degradation Constraints.

Figure 7:
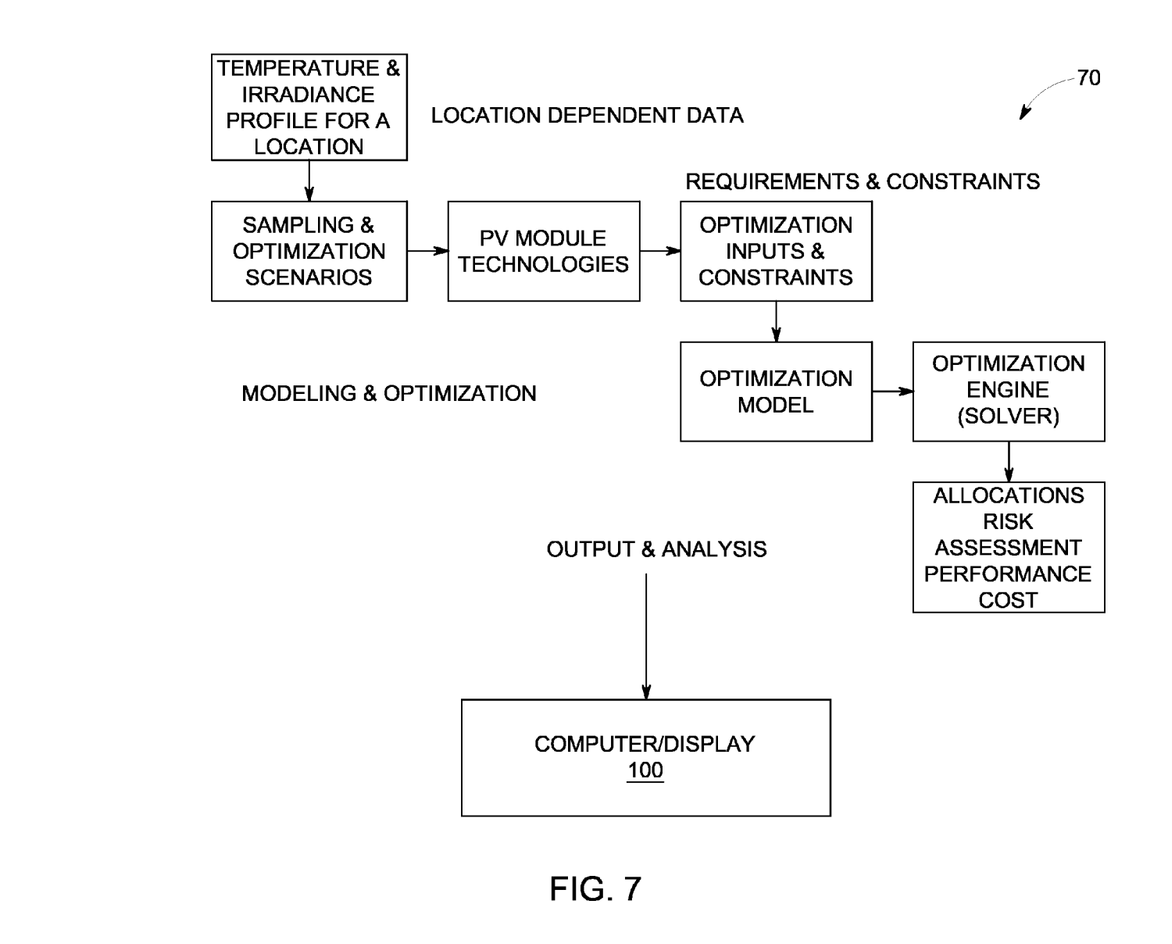
FIG. 7 illustrates an optimization framework as a flow diagram according to one embodiment.

The expected LCOE of the combined PV power plant under all input scenarios is minimized subject to area constraints, capacity constraints, budget constraints and performance requirements. The embodied optimization framework model is designed and structured to accommodate various scenarios and solve for percentage allocations. Data is input into the optimization framework to the model described herein, and then the optimization engine solves the desired objective function. The embodied method uses a solver to solve the system of equations to identify an optimal configuration that minimizes the overall LCOE while meeting all input constraints and determines percentage allocation of capacity to each of the module technologies in accordance with optimal allocation. FIG. 7 is a flowchart 70 illustrating the embodied optimization framework 70 as a flow diagram.

An example of mathematical representations of index, parameters, costs, performance criteria, decision variables, subset of plant, financial, performance constraints, LCOE and one objective function for one embodiment for estimating modules of different PV technologies within the same PV power plant are identified herein.

Index
t Module technology
s Scenario
n Year

Parameters
$p_s$ Probability of a scenario s
$W_p$ Required PV power plant size in Watt-peak
$E_{W_p}$ Minimum required Annual Energy Production (AEP) in KWh for PV power plant of size $W_p$
$A_{W_p}$ Available area in square miles for PV power plant of size $W_p$
$C_{W_p}$ Total available budget in dollars for PV power plant of size $W_p$
N Lifetime of PV power plant in years
$r_{tax}$ Tax rate in percentage
$d_{cash}$ Cash discount rate in percentage
$d_{real}$ Real discount rate in percentage
$A^t$ Area in square miles consumed per watt of module technology t Costs
$FC_{W_p}$ Initial fixed installation system cost for PV power plant expressed in $/W_p$
$IC^t$ Initial variable installation system cost for PV power plant with distributed DC-DC stage architecture and module technology t expressed in $/W_p$
$AC^t$ Recurring annual cost of PV power plant with distributed DC-DC stage architecture and module technology t expressed in $
$RV^t$ Residual value PV power plant with distributed DC-DC stage architecture and module technology t expressed in $
$D^t$ Depreciation amount for PV power plant with distributed DC-DC stage architecture and module technology t
$LCOE_s^t$ Levelized Cost of Electricity (LCOE) of PV power plant with distributed DC-DC stage architecture and module technology t for scenario s
$LCOE_s$ Levelized Cost of Electricity (LCOE) of PV power plant for combined module technologies, distributed DC-DC stage architecture and scenario s Performance
$AEP_s^t$ AEP of PV power plant with distributed DC-DC stage architecture and module technology t for scenario s
$\lambda^t$ Module degradation rate for technology t Decision Variables
$x^t$ Percentage of (DC) power supplied by technology t Constraints area
$$\sum_t x^t A^t W_p \leq A_{W_p}$$

Budget
$$FC_{W_p} + \sum_t x^t IC^t W_p \leq C_{W_p}$$

Performance
$$\sum_t x^i AEP_s^t \geq E_{W_p}$$

Capacity
$$\sum_t p^t = 1$$
$$p^t \geq 0 \quad \forall t$$

Variables

Levelized Cost of Electricity $$LCOE_s = \frac{\left(FC_{W_p} + \sum_t x^t IC^t W_p\right) - \left(\sum_{n=1}^N \sum_t \frac{(x^t D^t)}{(1+d_{cash})^n}(r_{tax})\right) + \left(\sum_{n=1}^N \sum_t \frac{(x^t AC^t)^n}{(1+d_{cash})^n}(1-r_{tax})\right)\left(\sum \frac{x^N RV^N}{(1+d_{cash})^N}\right)}{\left(\sum_{n=1}^N \sum_t \frac{x^t AEP_s^t (1-\lambda^t)^n}{(1+d_{real})^n}\right)}$$

Objective Function

Minimize $\sum_s p_s LCOE_s$

The decision variables are percentage allocation of the PV power plant capacity to each of the individual technologies considered. The capacity constraints limit the size of the PV power plant capacity. The budget constraints limit the cumulative budget available for initial setup of the plant. The area constraints limit the amount of land resource available. The performance requirements stipulate the minimum expected energy yield under each scenario. Since this embodied methodology is a math programming problem, state of the art commercial optimization solvers can be employed to solve it. During the planning stages, management personnel generally set constraints and thresholds for planning purposes. According to one aspect, a detailed bill of materials using the cost model can then be generated using the asset capacity plan.

The embodied methodology is then used to determine the best technology capacity allocation plan for a given scenario and to also determine a plan that minimizes the expected LCOE over multiple scenarios. The embodied methodology can further be used to assess the risk of not meeting the specified constraints and thresholds and to compare objectives across various plans and scenarios.

Figure 8:
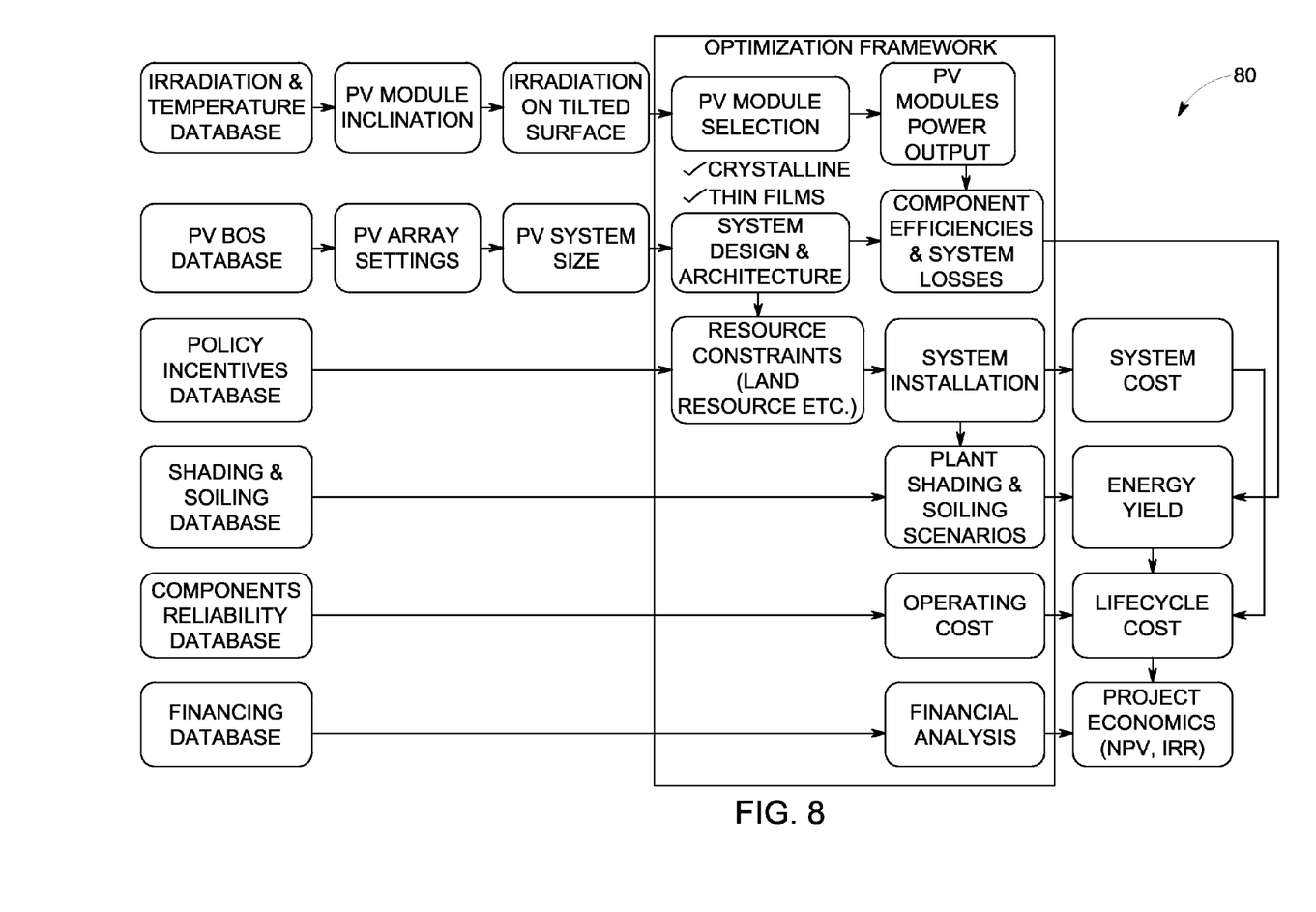
FIG. 8 is a block diagram illustrating components of an optimization framework used for PV power plant capacity allocation to selected module technologies according to one embodiment.

FIG. 8 is a block diagram illustrating components of an optimization framework 80 used for PV power plant capacity allocation to selected module technologies according to one embodiment. Optimization framework 70, including optimization components, is implemented using a computer/computing system 100 that may be integrated with the PV power plant(s) or may be independent from the PV power plant(s).

Figure 9:
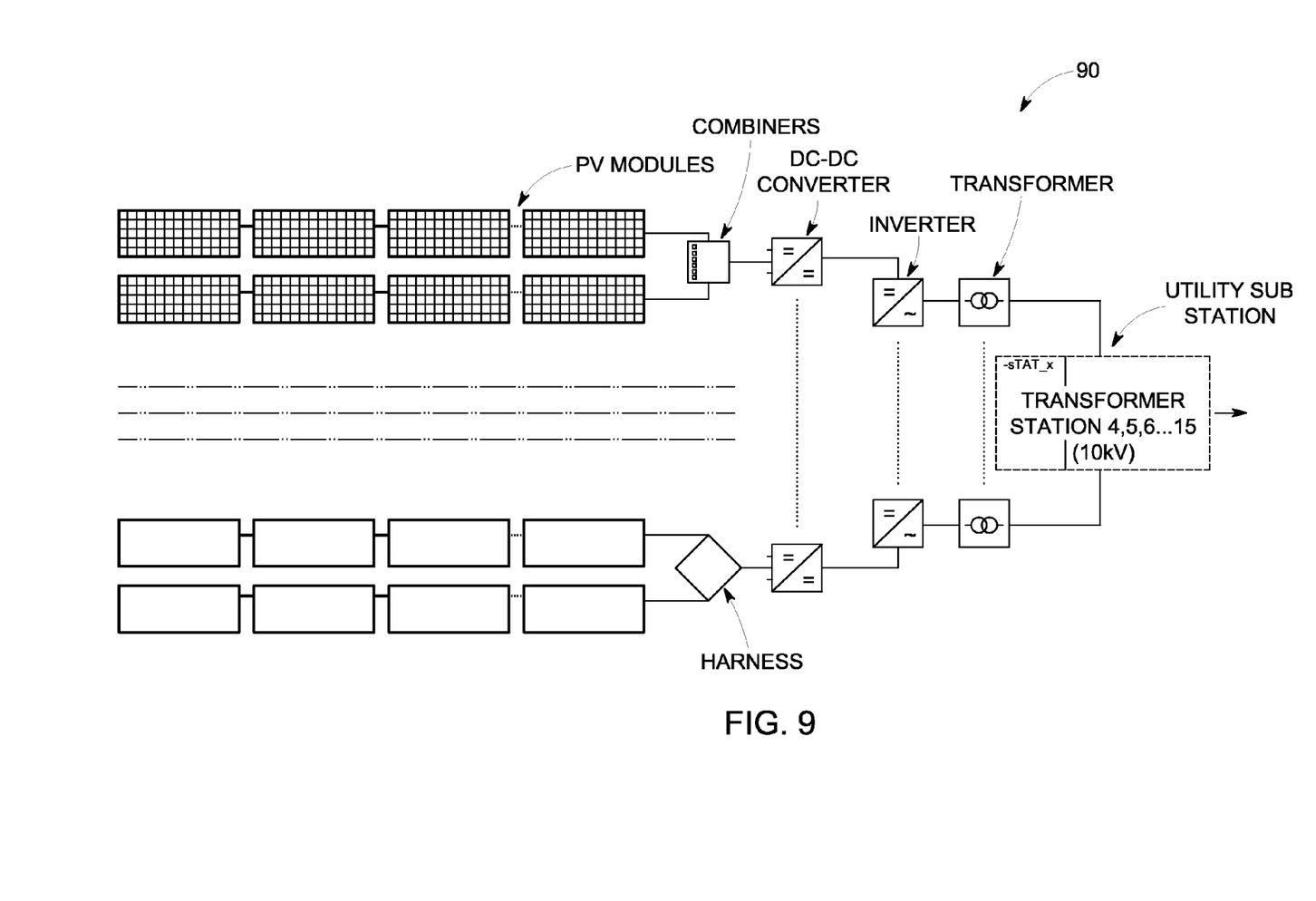
FIG. 9 illustrates a combined PV power plant using string level distributed MPPT with multiple PV module technologies according to one embodiment. The embodied combined PV power plant comprises string level distributed MPPT architecture using DC-DC converters that enable the design and operation of a PV power plant agnostic to module technology.

FIG. 9 illustrates a combined PV power plant 90 using combiner level distributed MPPT with multiple PV module technologies according to one embodiment. The combined PV power plant comprises string level distributed MPPT architecture using DC-DC converters and string level DC-AC inverters that enable the design and operation of a PV power plant agnostic to module technology.

Figure 10:
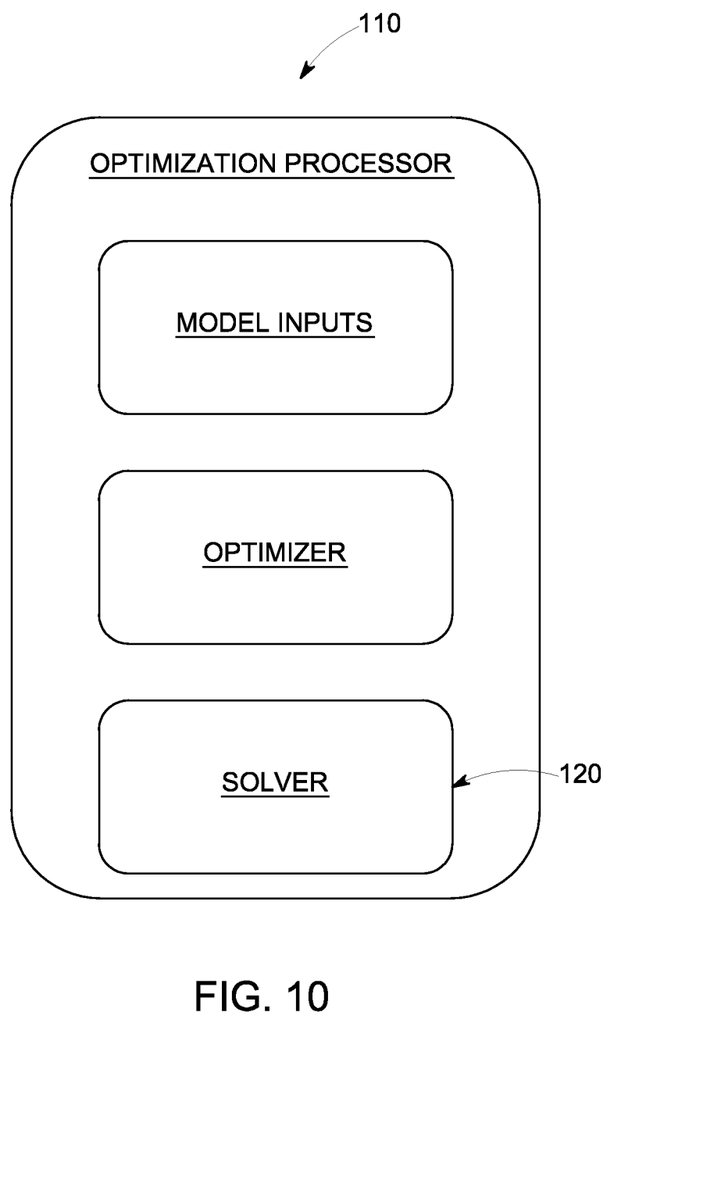
FIG. 10 illustrates an optimization processor according to one embodiment.

The embodied process of performing optimization comprises invoking a solver 120 depicted in FIG. 10 for solving a mixed integer (mathematical) program (MIP) that represents the PV system capacity allocation problem, its objectives and constraints. FIG. 10 illustrates an optimization processor 110 used for solving the embodied problem. The solver 120 seeks various feasible allocations of PV plant capacity to module technologies under consideration. A feasible allocation is that which satisfies all model constraints. For each feasible configuration, the system would then compute the expected installed cost, annual energy yield and LCOE. One process for performing optimization would then identify the best configuration for a given PV power plant. The solver 120 contains algorithms and techniques that solve and optimize the MIP problem. The solver 120 then provides an output that can be displayed on a user interface 100 such as depicted in FIG. 7. The objective function and constraints can be added or modified according to the business goals, business constraints and PV system constraints. Each system would have to be configured for a given location, set of technologies, plant size, business objective and plant constraints. An illustrative example of how the embodied process works is described herein below.

For this illustrative example, we consider a string level distributed MPPT architecture to enable PV modules of multiple technologies within the same PV power plant. It is assumed that performance gain for the multicrystalline silicon plant using distributed string level MPPT is about 4% and energy yield gain for a thin film (CdTe) plant with distributed string level MPPT and bypass diodes is about 3%.

TABLE I

Cumulative energy yield per watt of mcSi and CdTe modules in Alamosa, CO over a given year

| Location | Month | Average Temperature (C.) | Average Radiation (W/m2) | Cumulative Yield mcSi (kWh/Wp) | Cumulative Yield CdTe (kWh/Wp) |
|---|---|---|---|---|---|
| Alamosa | 1 | −10.88 | 192.69 | 0.195 | 0.180 |
| Alamosa | 2 | −4.76 | 221.27 | 0.218 | 0.207 |
| Alamosa | 3 | 1.37 | 254.95 | 0.245 | 0.238 |
| Alamosa | 4 | 6.32 | 284.40 | 0.265 | 0.263 |
| Alamosa | 5 | 10.60 | 292.20 | 0.271 | 0.270 |
| Alamosa | 6 | 16.53 | 316.14 | 0.283 | 0.290 |
| Alamosa | 7 | 17.77 | 295.75 | 0.269 | 0.272 |
| Alamosa | 8 | 16.48 | 282.09 | 0.254 | 0.258 |
| Alamosa | 9 | 12.96 | 284.23 | 0.259 | 0.263 |
| Alamosa | 10 | 6.86 | 244.33 | 0.228 | 0.228 |
| Alamosa | 11 | −2.92 | 200.52 | 0.199 | 0.187 |
| Alamosa | 12 | −7.65 | 180.62 | 0.182 | 0.168 |
| | | | Total | 2.868 | 2.824 |

Two cases are considered to show how the allocations differ. In the first case, there are no area constraints on the PV power plant and in the second case, area constraints for the PV power plant are introduced. The percentage allocations of capacity to different PV module technologies differ when area constraints are introduced.

TABLE II

Cost and Energy Yield for PV power plant with multiple PV module technologies
(a) Case 1: No Area Constraints

| Technology | MPPT | Expected System Cost ($/Wp) | Expected System Yield (kWh/Wp) | Expected LCOE ($/kWh) | Area (sq · m/Wp) | Allocation (%) |
|---|---|---|---|---|---|---|
| mcSi | Central Inverter | 2.83 | 2.094 | 0.073 | 0.0084 | 100% |
| CdTe | Central Inverter | 2.72 | 2.062 | 0.074 | 0.0118 | 100% |
| mcSi | String Level | 2.86 | 2.177 | 0.072 | 0.0084 | 30% |
| CdTe | String Level | 2.82 | 2.124 | 0.073 | 0.0118 | 70% |
| Combined | String Level | 2.83 | 2.140 | 0.072 | 0.0108 | |

| Constraints | Area | Budget | Yield | LCOE |
|---|---|---|---|---|
| | None | 2.84 | 2.14 | 0.072 |

TABLE III

Cost and Energy Yield for PV power plant with multiple PV module technologies
(b) Case 2: With Area Constraints

| Technology | MPPT | Expected System Cost ($/Wp) | Expected System Yield (kWh/Wp) | Expected LCOE ($/kWh) | Area (sq·m/Wp) | Allocation (%) |
|---|---|---|---|---|---|---|
| mcSi | Central Inverter | 2.83 | 2.094 | 0.073 | 0.0084 | 100% |
| CdTe | Central Inverter | 2.72 | 2.062 | 0.074 | 0.0118 | 100% |
| mcSi | String Level | 2.86 | 2.177 | 0.072 | 0.0084 | 40% |
| CdTe | String Level | 2.82 | 2.124 | 0.073 | 0.0118 | 60% |
| Combined | String Level | 2.84 | 2.145 | 0.072 | 0.0105 | |

| Constraints | Area | Budget | Yield | LCOE |
|---|---|---|---|---|
| | 0.105 | 2.84 | 2.14 | 0.072 |

While only certain features of the embodiments have been illustrated and described herein, many modifications and changes will occur to those skilled in the art. It is, therefore, to be understood that the appended claims are intended to cover all such modifications and changes as fall within the true spirit of the invention.

The invention claimed is:

1. A photovoltaic (PV) power plant comprising:
a first PV module having a first maximum power point;
a second PV module having a second maximum power point,
wherein the first maximum power point is different from the second maximum power point under identical operating conditions;
an optimization processor programmed with algorithmic software to generate an estimated system cost and a levelized cost of electricity (LCOE) for the PV power plant;
a first DC-DC converter in electrical communication with the first PV module, wherein the first DC-DC converter comprises a maximum power point tracker or maximum power point controller programmed to track and maximize the first PV module power point, the first DC-DC converter connected to a corresponding first DC-AC string level inverter; and
a second DC-DC converter in electrical communication with the second PV module, wherein the second DC-DC converter comprises a maximum power point tracker or maximum power point controller programmed to track and maximize the second PV module power point, the second DC-DC converter connected to a corresponding second DC-AC string level inverter;
wherein PV module technologies of the first and second PV module have dissimilar electrical operating characteristics;
wherein the optimization processor is further programmed to estimate a percentage allocation of the PV power plant capacity to the PV module technologies of the first and second PV module based upon the estimated system cost and the LCOE for the PV power plant, and wherein the LCOE is represented as, $$LCOE_s = \frac{\left(FC_{W_p} + \sum_t x^t IC^t W_p\right) - \left(\sum_{n=1}^{N}\sum_t \frac{(x^t D^t)}{(1+d_{cash})^n}(r_{tax})\right) + \left(\sum_{n=1}^{N}\sum_t \frac{(x^t AC^t)^n}{(1+d_{cash})^n}(1-r_{tax})\right) - \left(\sum \frac{x^N RV^N}{(1+d_{cash})^N}\right)}{\left(\sum_{n=1}^{N}\sum_t \frac{x^t AEP^t_s(1-\lambda^t)^n}{(1+d_{cash})^n}\right)}$$

wherein s represents a scenario, $FC_{w_p}$ represents initial fixed installation system cost for the PV power plant expressed in $/W_p$ wherein $W_p$ represents required PV power plant size in Watt-peak, $x^t$ represents percentage of DC power supplied by module technology t, $IC^t$ represents initial variable installation system cost for PV power plant with distributed DC-DC stage architecture and module technology t expressed in $/W_p$, N represents lifetime of PV power plant in years, n represent a year, $D^t$ represents depreciation amount for PV power plant with distributed DC-DC stage architecture and module technology t, $d_{cash}$ represents cash discount rate in percentage, $r_{tax}$ represents tax rate in percentage, $AC^t$ represents recurring annual cost of PV power plant with distributed DC-DC stage architecture and module technology t expressed in $, $RV^N$ represents residual value of PV power plant with distributed DC-DC stage architecture and module technology t expressed in $, $x^N$ represents percentage of DC power supplied by technology t during lifetime of PV power plant in years, $AEP^t_s$ represents performance/yield requirements of the PV power plant with distributed DC-DC stage architecture and module technology t for scenario s, $\lambda^t$ represents module degradation rate for technology t, and $d_{real}$ represents a real discount rate in percentage;
wherein the optimization processor is further programmed to minimize the LCOE of the PV power plant relative to the PV module technologies of the first and second PV modules under multiple scenarios and subject to desired constraints and requirements.

2. The PV power plant according to claim 1, wherein the desired constraints and requirements are selected from area constraints, capacity constraints, budget constraints, yield requirements power density requirements, toxic/material constraints, voltage requirements, transmission constraints, and system degradation constraints.

3. The PV power plant according to claim 1, wherein the first PV module has a conversion efficiency different from the second PV module.

4. The PV power plant according to claim 1, wherein the first PV module exhibits a response to irradiation, temperature and spectral quality that is different from the second PV module.

5. A photovoltaic (PV) power plant comprising:
a first string of PV modules which has a first maximum power point, the first string of PV modules comprising a plurality of first PV modules;
a second string of PV modules which has a second maximum power point, the second string of PV modules comprising a plurality of second PV modules;
wherein the first maximum power point is different from the second maximum power point under identical operating conditions;
an optimization processor programmed with algorithmic software to generate an estimated system cost and a levelized cost of electricity (LCOE) for the PV power plant;
a first DC-AC converter in electrical communication with the first string of PV modules, wherein the first DC-AC converter comprises a maximum power point tracker or maximum power point controller programmed to track and maximize the first PV module string power point; and
a second DC-AC converter in electrical communication with the second string of PV modules, wherein the second DC-AC converter comprises a maximum power point tracker or maximum power point controller programmed to track and maximize the second PV module string power point,
wherein the plurality of first PV modules are connected to a first DC-DC converter at a combiner level;
wherein the plurality of second PV modules are connected to a second DC-DC converter at a combiner level;
wherein PV module technologies of the plurality of first PV modules and the plurality of second PV modules have dissimilar electrical operating characteristics;
wherein the optimization processor is further programmed to estimate a percentage allocation of the PV power plant capacity to the PV module technologies of the first string of PV modules and the second string of PV modules are based upon the estimated system cost and the LCOE for the PV power plant, and wherein the LCOE is represented as $$LCOE_s = \frac{\left(FCw_p + \sum_t x^t IC^t W_p\right) - \left(\sum_{n=1}^{N} \sum_t \frac{(x^t D^t)}{(1+d_{cash})^n}(r_{tax})\right) + \left(\sum_{n=1}^{N} \sum_t \frac{(x^t AC^t)^n}{(1+d_{cash})^n}(1-r_{tax})\right) - \left(\sum \frac{x^N RV^N}{(1+d_{cash})^N}\right)}{\left(\sum_{n=1}^{N} \sum_t \frac{x^t AEP_s^t(1-\lambda^t)^n}{(1+d_{cash})^n}\right)}$$

wherein s represents a scenario, $FCw_p$ represents initial fixed installation system cost for the PV power plant expressed in $/W_p$ wherein $W_p$ represents required PV power plant size in Watt-peak, $x^t$ represents percentage of DC power supplied by module technology t, $IC^t$ represents initial variable installation system cost for PV power plant with distributed DC-DC stage architecture and module technology t expressed in $/W_p$, N represents lifetime of PV power plant in years, n represent a year, $D^t$ represents depreciation amount for PV power plant with distributed DC-DC stage architecture and module technology t, $d_{cash}$ represents cash discount rate in percentage, $r_{tax}$ represents tax rate in percentage, $AC^t$ represents recurring annual cost of PV power plant with distributed DC-DC stage architecture and module technology t expressed in $, $RV^N$ represents residual value of PV power plant with distributed DC-DC stage architecture and module technology t expressed in $, $x^N$ represents percentage of DC power supplied by technology t during lifetime of PV power plant in years, $AEP_s^t$ represents performance/yield requirements of the PV power plant with distributed DC-DC stage architecture and module technology t for scenario s, $\lambda^t$ represents module degradation rate for technology t, and $d_{real}$ represents a real discount rate in percentage;
wherein the optimization processor is further programmed to minimize the LCOE of the PV power plant relative to the PV module technologies of the first and second PV modules under multiple scenarios and subject to desired constraints and requirements.

6. The PV power plant according to claim 5, wherein the PV module technologies of the first string of PV module and the second string of PV modules are different from each other.

7. The PV power plant according to claim 1, wherein the desired constraints and requirements are selected from area constraints, capacity constraints, budget constraints, yield requirements, power density requirements, toxic/material constraints, voltage requirements, transmission constraints, and system degradation constraints.

8. The PV power plant according to claim 5, wherein the first string of PV modules has a conversion efficiency different from the second string of PV modules.

9. The PV power plant according to claim 5, wherein the first string of PV modules exhibits a response to irradiation, temperature and spectral quality that is different from the second string of PV modules.

10. A photovoltaic (PV) power plant comprising:
a plurality of PV modules, and an optimization processor programmed with algorithmic software to generate an estimated system cost and levelized cost of electricity (LCOE) for the PV power plant;
wherein the plurality of PV modules comprises a plurality of PV module technologies;
wherein the plurality of PV modules has a plurality of differing maximum power points under operating conditions identical to all PV modules within the plurality of PV modules; and
each of a plurality of DC-DC converters in electrical communication with respective ones of the plurality of PV modules,
wherein each DC-DC converter comprises a maximum power point tracker or maximum power point controller programmed to track and maximize an individual PV module power point, a power point for a string of PV modules, a power point for a plurality of strings of PV modules, or a combination thereof, wherein the string of PV modules comprises one or more PV modules of the plurality of PV modules electrically coupled in series, wherein PV module technologies of the plurality of PV modules have dissimilar electrical operating characteristics;

wherein the optimization processor is further programmed to estimate a percentage allocation of the PV power plant capacity to the PV module technologies of the plurality of PV modules based upon the estimated system cost and the LCOE for the PV power plant, and wherein the LCOE is represented as $$LCOE_s = \frac{\left(FC_{W_p} + \sum_t x^t IC^t W_p\right) - \left(\sum_{n=1}^{N}\sum_t \frac{(x^t D^t)}{(1+d_{cash})^n}(r_{tax})\right) + \left(\sum_{n=1}^{N}\sum_t \frac{(x^t AC^t)^n}{(1+d_{cash})^n}(1-r_{tax})\right) - \left(\sum \frac{x^N RV^N}{(1+d_{cash})^N}\right)}{\left(\sum_{n=1}^{N}\sum_t \frac{x^t AEP_s^t(1-\lambda^t)^n}{(1+d_{cash})^n}\right)}$$

wherein s represents a scenario, $FC_{w_p}$ represents initial fixed installation system cost for the PV power plant expressed in $1 $W_p$ wherein $W_p$ represents required PV power plant size in Watt-peak, $x^t$ represents percentage of DC power supplied by module technology t, $IC^t$ represents initial variable installation system cost for PV power plant with distributed DC-DC stage architecture and module technology t expressed in $/$W_p$, N represents lifetime of PV power plant in years, n represent a year, $D^t$ represents depreciation amount for PV power plant with distributed DC-DC stage architecture and module technology t, $d_{cash}$ represents cash discount rate in percentage, $r_{tax}$ represents tax rate in percentage, $AC^t$ represents recurring annual cost of PV power plant with distributed DC-DC stage architecture and module technology t expressed in $, $RV^N$ represents residual value of PV power plant with distributed DC-DC stage architecture and module technology t expressed in $, $x^N$ represents percentage of DC power supplied by technology t during lifetime of PV power plant in years, $AEP^t_s$ represents performance/yield requirements of the PV power plant with distributed DC-DC stage architecture and module technology t for scenario s, $\lambda^t$ represents module degradation rate for technology t, and $d_{real}$ represents a real discount rate in percentage;

wherein the optimization processor is further programmed to minimize the LCOE of the PV power plant relative to the PV module technologies of the plurality of PV modules under multiple scenarios and subject to desired constraints and requirements.

11. The PV power plant according to claim 10, wherein the desired constraints and requirements are selected from area constraints, capacity constraints, budget constraints, yield requirements, power density requirements, toxic/material constraints, voltage requirements, transmission constraints, and system degradation constraints.

12. The PV power plant according to claim 10, wherein the plurality of PV modules comprises a plurality of PV module conversion efficiencies.

13. The PV power plant according to claim 10, wherein at least one PV module exhibits a response to irradiation, temperature and spectral quality that is different from at least one other PV module within the plurality of PV modules.

14. A method of optimizing a photovoltaic (PV) power plant with multiple photovoltaic module technologies, the method comprising:

integrating a plurality of PV modules for the PV power plant in which at least one PV module comprises a PV module technology different from another PV module within the plurality of PV modules;

integrating the plurality of PV modules into a plurality of PV module strings for the PV power plant in which at least one PV module string comprises a PV module technology different from another PV module string within the plurality of PV module strings, a first DC-AC converter in electrical communication with the at least one PV module string, wherein the first DC-AC converter comprises a maximum power point tracker or maximum power point controller programmed to track and maximize the at least one PV module string power point; and a second DC-AC converter in electrical communication with the another PV module string, wherein the second DC-AC converter comprises a maximum power point tracker or maximum power point controller programmed to track and maximize the another PV module string power point, wherein the at least one PV module and the another PV module are connected to a first DC-DC converter at a combiner level;

wherein the PV module technologies of the at least one PV modules and the another PV module have dissimilar electrical operating characteristics;

programming an optimization processor with algorithmic software to generate an estimated system cost and levelized cost of electricity (LCOE) for the PV power plant relative to selected PV technology scenarios and subject to desired constraints and requirements, selecting the desired constraints and requirements from area constraints, capacity constraints, budget constraints, yield requirements, power density requirements, toxic/material constraints, voltage requirements, transmission constraints, and system degradation constraints;

and estimating, via the optimization processor, a percentage allocation of the PV power plant capacity to the PV module technologies of the plurality of PV modules based upon the estimated system cost and the LCOE for the PV power plant, wherein the estimated LCOE is represented as, $$LCOE_s = \frac{\left(FC_{W_p} + \sum_t x^t IC^t W_p\right) - \left(\sum_{n=1}^{N} \sum_t \frac{(x^t D^t)}{(1+d_{cash})^n}(r_{tax})\right) + \left(\sum_{n=1}^{N} \sum_t \frac{(x^t AC^t)^n}{(1+d_{cash})^n}(1-r_{tax})\right) - \left(\sum \frac{x^N RV^N}{(1+d_{cash})^N}\right)}{\left(\sum_{n=1}^{N} \sum_t \frac{x^t AEP_s^t(1-\lambda^t)^n}{(1+d_{cash})^n}\right)}$$

wherein s represents a scenario, $FC_{w_p}$ represents initial fixed installation system cost for the PV power plant expressed in $/W_p$ wherein $W_p$ represents required PV power plant size in Watt-peak, $x^t$ represents percentage of DC power supplied by module technology t, $IC^t$ represents initial variable installation system cost for PV power plant with distributed DC-DC stage architecture and module technology t expressed in $/W_p$, N represents lifetime of PV power plant in years, n represent a year, $D^t$ represents depreciation amount for PV power plant with distributed DC-DC stage architecture and module technology t, $d_{cash}$ represents cash discount rate in percentage, $r_{tax}$ represents tax rate in percentage, $AC^t$ represents recurring annual cost of PV power plant with distributed DC-DC stage architecture and module technology t expressed in $, $RV^N$ represents residual value of PV power plant with distributed DC-DC stage architecture and module technology t expressed in $, $x^N$ represents percentage of DC power supplied by technology t during lifetime of PV power plant in years, $AEP^t_s$ represents performance/yield requirements of the PV power plant with distributed DC-DC stage architecture and module technology t for scenario s, $\lambda^t$ represents module degradation rate for technology t, and $d_{real}$ represents a real discount rate in percentage;

wherein the optimization processor is further programmed to minimize the LCOE of the PV power plant relative to the PV module technologies of the first and second PV modules under multiple scenarios and subject to desired constraints and requirements.

* * * * *